United States Patent [19]

Tom

[11] Patent Number: 5,761,910
[45] Date of Patent: Jun. 9, 1998

[54] HIGH CAPACITY GAS STORAGE AND DISPENSING SYSTEM

[75] Inventor: Glenn M. Tom, New Milford, Conn.

[73] Assignee: Advanced Technology Materials, Inc., Danbury, Conn.

[21] Appl. No.: 859,172

[22] Filed: May 20, 1997

Related U.S. Application Data

[60] Provisional application No. 60/019,043 May 20, 1996.
[51] Int. Cl.⁶ ............................................. E17C 11/00
[52] U.S. Cl. .......................... 62/46.1; 95/95; 96/108; 206/0.7
[58] Field of Search ............................ 62/46.1, 55.5; 95/95; 96/108; 206/0.7

[56] References Cited

U.S. PATENT DOCUMENTS

| | | | |
|---|---|---|---|
| 3,732,690 | 5/1973 | Meijer | 123/14 |
| 3,972,201 | 8/1976 | Datis | 62/46.1 |
| 4,756,163 | 7/1988 | Garg | 62/46.1 |
| 4,930,319 | 6/1990 | Bee et al. | 62/46.1 |

Primary Examiner—Ronald C. Capossela
Attorney, Agent, or Firm—Steven J. Hultquist; Oliver A. Zitzmann

[57] ABSTRACT

A system for the storage and on-demand dispensing of a fluid that is sorbable on a physical sorbent and that subsequent to sorption is desorbable from the sorbent by pressure-mediated desorption and/or thermally-mediated desorption. The system includes a storage and dispensing vessel containing the physical sorbent; a surge tank for holding fluid that is desorbed from the physical sorbent and flowed to the surge tank for subsequent discharge; a first flow passage joining the surge tank in flow communication with the storage and dispensing vessel; a pump operatively coupled with the first flow passage means, and selectively operable to effect desorption of fluid in the storage and dispensing vessel, and transfer of desorbed fluid through the first flow passage to the surge tank for holding therein; an actuating assembly for monitoring pressure of fluid held in the surge tank and responsively thereto actuating or deactuating the pump, to maintain a predetermined pressure range of fluid in the surge tank; a second flow passage for discharging fluid from the surge tank; and flow control means operatively coupled with the second flow passage, to selectively control flow of fluid from the surge tank through the second flow passage.

3 Claims, 2 Drawing Sheets

HIGH CAPACITY GAS STORAGE AND DISPENSING SYSTEM

CROSS REFERENCE TO RELATED APPLICATIONS

This application is based on and claims the priority of U.S. Provisional patent application Ser. No. 60/019,043 filed May 20, 1996.

BACKGROUND OF THE INVENTION

1. Field of the Invention

This invention relates generally to storage and dispensing systems for the selective dispensing of fluids from a vessel in which the fluid component(s) are sorptively retained by a solid sorbent medium, and are desorptively released from the sorbent medium in the dispensing operation. More specifically, the invention relates to a storage and dispensing system of such type which is able to supply desorbed fluid at constant high rate during sustained operation.

2. Description of the Related Art

In a wide variety of industrial processes and applications, there is a need for a reliable source of process fluid(s) which is compact, portable, and available to supply the fluid(s) on demand. Such processes and applications include semiconductor manufacturing, ion implantation, manufacture of flat panel displays, medical treatment, water treatment, emergency breathing equipment, welding operations, space-based applications involving delivery of liquids and gases, etc.

U.S. Pat. No. 4,744,221 issued May 17, 1988 to Karl O. Knollmueller discloses a method of storing and subsequently delivering arsine, by contacting arsine at a temperature of from about $-30°$ C. to about $+30°$ C. with a zeolite of pore size in the range of from about 5 to about 15 Angstroms to adsorb arsine on the zeolite, and then dispensing the arsine by heating the zeolite to an elevated temperature of up to about $175°$ C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent.

The gas storage and dispensing system of the Tom et al. patent comprises an adsorption-desorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapid increasing interior gas pressure in the cylinder.

The gas storage and dispensing vessel of the Tom et al. patent thus reduces the pressure of stored sorbate gases by reversibly adsorbing them onto a carrier sorbent, e.g., a zeolite or activated carbon material.

It is an object of the present invention to provide an improved fluid storage and dispensing system of the above-described type, which is capable of supplying fluid at sustained high flow rates.

Other objects and advantages of the invention will be more fully apparent from the ensuing disclosure.

SUMMARY OF THE INVENTION

The present invention relates to a system for storage and dispensing of a sorbable fluid, comprising a storage and dispensing vessel constructed and arranged to hold a solid-phase physical sorbent medium having a sorptive affinity for the sorbable fluid, and for selectively flowing sorbable fluid into and out of such vessel. A solid-phase physical sorbent medium having a sorptive affinity for the fluid is disposed in the storage and dispensing vessel at an interior gas pressure. The sorbable fluid is physically adsorbed on the sorbent medium. A dispensing assembly is coupled in gas flow communication with the storage and dispensing vessel, and constructed and arranged for selective on-demand dispensing of desorbed fluid, after thermal and/or pressure differential-mediated desorption of the fluid from the sorbent material.

The dispensing assembly may for example be constructed and arranged:

(I) to provide, exteriorly of said storage and dispensing vessel, a pressure below the interior pressure, to effect desorption of fluid from the sorbent material, and flow of desorbed fluid from the vessel through the dispensing assembly; and/or (II) to flow thermally desorbed fluid therethrough, and comprising means for heating the carbon sorbent material to effect desorption of the fluid therefrom, so that the desorbed fluid flows from the vessel into the dispensing assembly.

For example, the dispensing assembly may be arranged to include a pump or other means to exert pumping action or suction on the interior volume of the storage and dispensing vessel, to extract desorbed fluid from the sorbent material therein.

The invention relates in one aspect to a system for the storage and on-demand dispensing of a fluid that is sorbable on a selected physical sorbent and that subsequent to sorption is desorbable from the sorbent by pressure-mediated desorption, e.g., pressure reduction desorption, and/or thermally-mediated desorption of the sorbable fluid from the sorbent material.

The present invention more particularly contemplates the provision of a storage and dispensing system of the type more fully described in U.S. Pat. No. 5,518,528 and U.S. Pat. No. 5,704,965 in the names of Glenn M. Tom and James V. McManus for "FLUID STORAGE AND DELIVERY SYSTEM UTILIZING CARBON SORBENT MEDIUM," in combination with a sue tank, interposed pump, and flow control means operatively coupled therewith, to provide a sustained high flow rate dispensing of fluid desorptively extracted from the sorbent in the storage and dispensing vessel of the system.

In one particular embodiment, the system comprises:
a storage and dispensing vessel, containing the physical sorbent;
a surge tank for holding fluid that is desorbed from the physical sorbent and flowed to the surge tank for subsequent discharge;
first flow passage means joining the surge tank in flow communication with the storage and dispensing vessel;
a pump operatively coupled with the first flow passage means, and selectively operable to effect desorption of fluid in the storage and dispensing vessel, and to transfer desorbed fluid through the first flow passage means to the surge tank for holding therein;
an actuating assembly for monitoring pressure of fluid held in the surge tank and, responsively thereto actuating or deactuating the pump, to maintain a predetermined pressure range of fluid in the surge tank;
second flow passage means for discharging gas from the surge tank; and
flow control means operatively coupled with the second flow passage means, to selectively control flow of fluid from the surge tank through the second flow passage means.

The system described above may further comprise flow control means operatively coupled with the first flow passage means upstream of the pump, to selectively control flow of fluid from the storage and dispensing vessel through the first flow passage means to the surge tank.

The storage and dispensing vessel may optionally have associated therewith means for thermally effecting desorption of the sorbable fluid from the sorbent material in the vessel.

Other aspects and features of the invention will be more fully apparent from the ensuing disclosure.

DETAILED DESCRIPTION OF THE INVENTION, AND PREFERRED EMBODIMENTS THEREOF

The disclosure of U.S. Pat. No. 5,518,528 issued May 21, 1996 in the names of Glenn M. Tom and James V. McManus, and the disclosure of U.S. Pat. No. 5,704,965 in the names of Glenn M. Tom and James V. McManus for "FLUID STORAGE AND DELIVERY SYSTEM UTILIZING CARBON SORBENT MEDIUM," hereby are incorporated herein by reference in their entirety.

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids.

Figure 1:
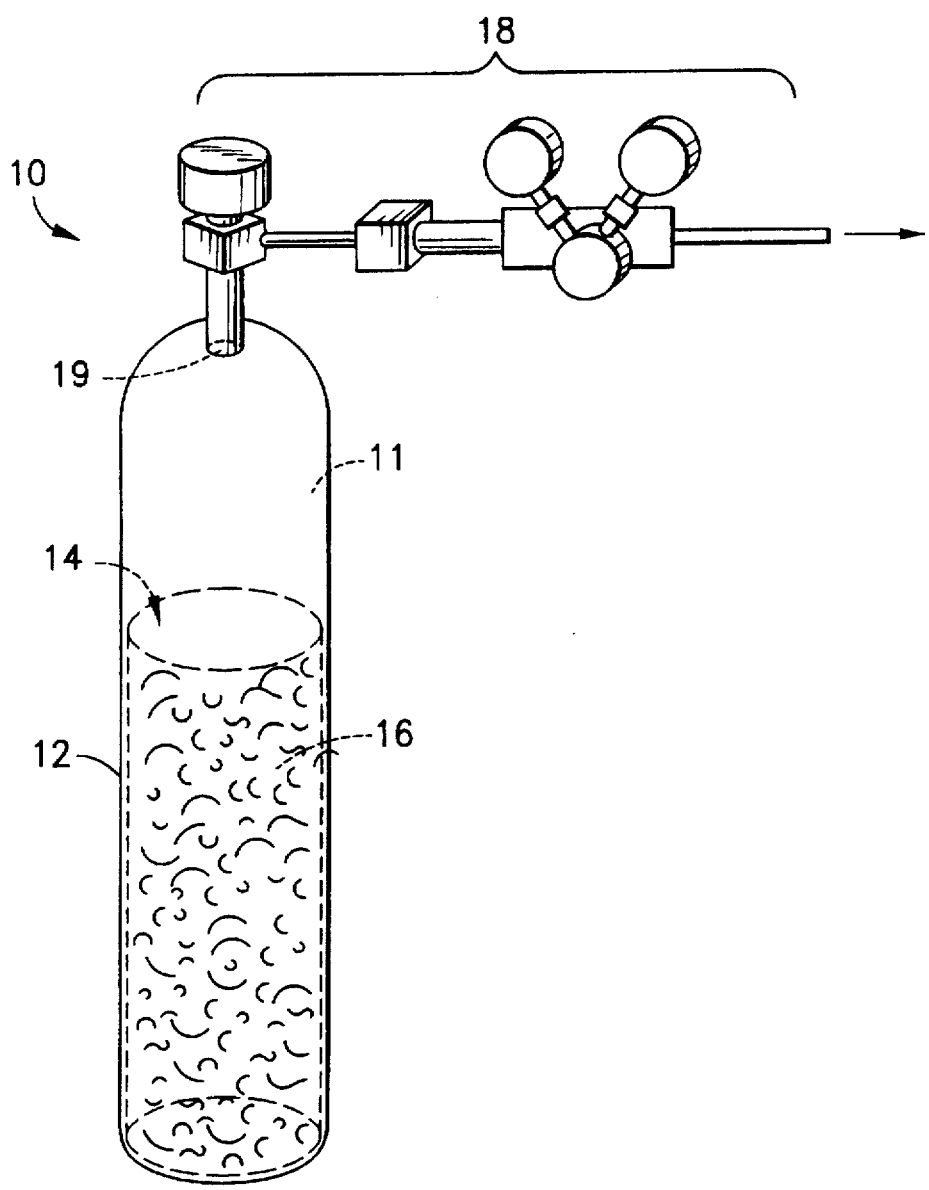
FIG. 1 is a schematic perspective representation of a storage and dispensing vessel and associated flow circuitry according to one embodiment of the invention.

Referring now to the drawings, FIG. 1 is a schematic representation of a storage and dispensing system 10 comprising storage and dispensing vessel 12. The storage and dispensing vessel may for example comprise a conventional gas cylinder container of elongate character, having an aspect ratio of height to diameter which may for example be in the range of from about 3 to about 10. In the interior volume 11 of such vessel is disposed a bed 14 of a suitable sorbent medium 16.

The vessel 12 is provided at its upper end with a conventional cylinder head fluid dispensing assembly 18 coupled with the main body of the cylinder 12 at the port 19. Port 19 allows fluid flow from the interior volume 11 of the cylinder into the dispensing assembly 18. To prevent entrainment of particulate solids in the fluid being dispensed from the cylinder, the port 19 may be provided with a frit or other filter means therein.

The sorbent medium 16 may comprise any suitable sorptively effective material, having sorptive affinity for the fluid to be stored and subsequently dispensed from the vessel 12, and from which the sorbate is suitably desorbable. Examples include a crystalline aluminosilicate composition, e.g., a micropore aluminosilicate composition with a pore size in the range of from about 4 to about 13 Å, a mesopore crystalline aluminosilicate composition with a pore size in the range of from about 20 to about 40 Å, a carbon sorbent material such as a bead activated carbon sorbent of highly uniform spherical particle shape, e.g., BAC-MP, BAC-LP, and BAC-G-70R bead carbon materials (Kureha Corporation of America, New York, N.Y.), silica, alumina, macroreticulate polymers, kieselguhr, etc.

The sorbent material may be suitably processed or treated to ensure that it is devoid of trace components which may deleteriously affect the performance of the fluid storage and dispensing system. For example, the sorbent may be subjected to washing treatment, e.g., with hydrofluoric acid, to render it sufficiently free of trace components such as metals and oxidic translation metal species.

Figure 2:
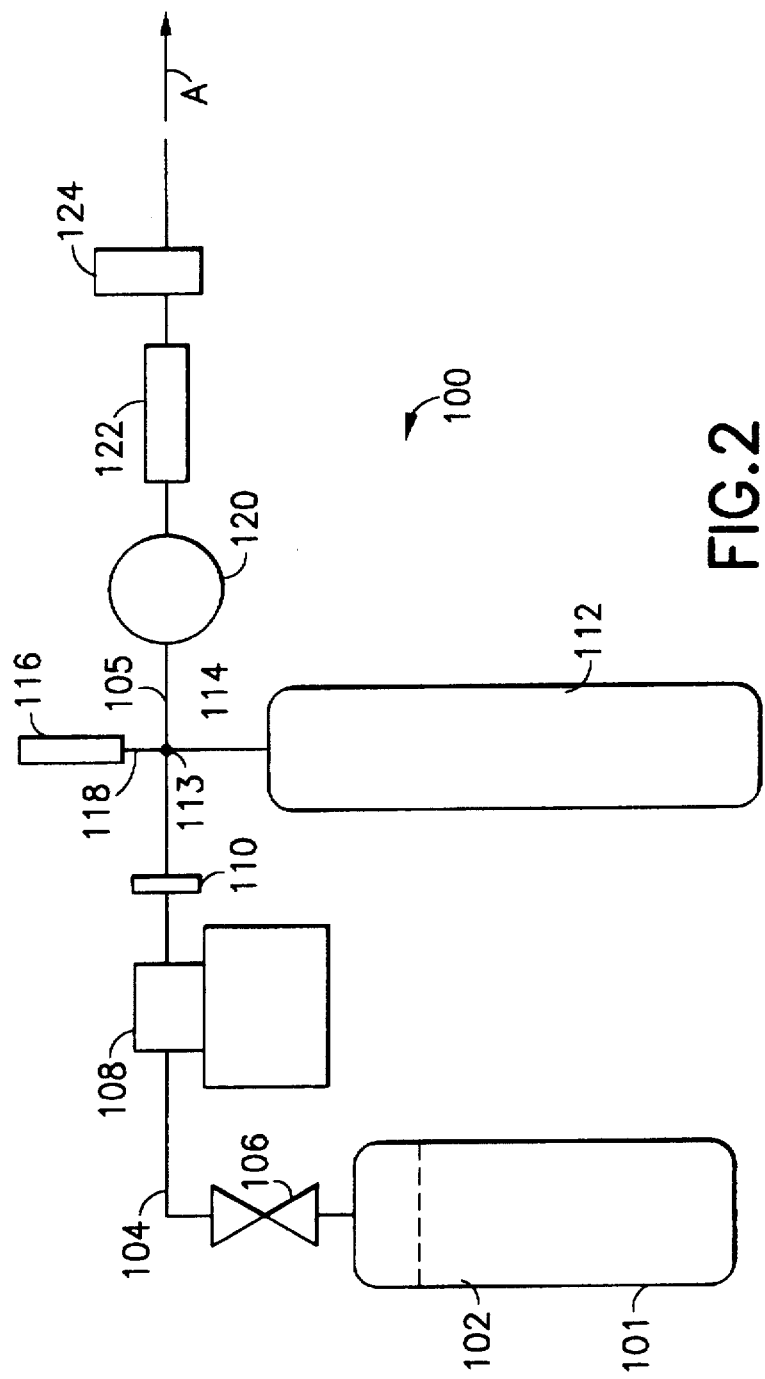
FIG. 2 is a schematic flowsheet of a high rate delivery storage and dispensing system according to one aspect of the present invention.

FIG. 2 is a schematic flowsheet of a high rate delivery storage and dispensing system 100 according to one aspect of the present invention. The system illustrated can be utilized to deliver large amounts of the sorbate fluid from the storage and dispensing system at high flow rates.

The system 100 comprises a storage and dispensing vessel 101 containing a bed 102 of sorbent material having sorptive affinity for the fluid to be stored in and dispensed from the vessel. The vessel as schematically illustrated in FIG. 2 is joined to a discharge line 104, which may comprise a conduit, tubing, piping, flow channel, or other flow passage means for effect dispensing fluid transfer exteriorly of the storage and dispensing vessel.

A flow control valve 106 is provided in line 104, with a pump 108 downstream therefrom and a filter 110 for attenuating particulates which otherwise may be present in the fluid flowed in line 104 from the storage and dispensing vessel, or which are otherwise generated in the pump. The pump may be of any suitable type, but preferably is a double stage all metal sealed diaphragm pump. Such pumps are preferred in the practice of the invention for safety and purity reasons, and are characterized by low leak rates and capacity of high pumping speeds.

Line 104 is joined to a 4-way connector 113. The 4-way connector is joined by means of line 114 to surge tank 112, thereby establishing flow communication of the surge tank 112 with the storage and dispensing vessel 102 and pump 108.

Also joined to the 4-way connector via line 118 is a pressure transducer 116. The 4-way connector 113 additionally is connected to the fluid dispensing discharge line 105, having disposed therein an absolute pressure regulator 120, a purifier 122, and a mass flow controller 124. Fluid exiting the fluid dispensing discharge line 105 is passed by suitable flow passage means (not shown), in the direction indicated by arrow A, to the downstream process system or locus of use of the dispensed fluid.

In operation, the storage and dispensing vessel, containing the sorbent material which sorptively holds the fluid to be dispensed, is subjected to pumping by the pump 108, with the filtered (by filter 110) fluid at the high pressure side of the pump being fed to the surge tanks 112. The system can be set for turn-down or turn-off of the pump, or isolation of the inlet of the pump, by a suitable valve means (not shown), when the pressure monitored by the pressure transducer 116 rises to a high predetermined limit, e.g., 700 Torr. Correspondingly, the system can be selectively arranged, by means of suitable controller and actuator means of a type well known in the art, for turn-on of the pump, or opening of an isolation valve at the inlet to the pump (not shown), when the pressure monitored by the pressure transducer declines to a predetermined lower limit, e.g., 300 Torr.

The fluid pressure downstream from the surge tank is monitored by the absolute pressure regulator 120. The purifier 122 downstream from the absolute pressure regulator serves to purify the fluid being dispensed, to chemisorptively remove any deleterious or unwanted components from the fluid stream, e.g., water and oxidants. The purifier also serves to provide filtration of the dispensed fluid stream. The purifier may be of any suitable type, including purifiers commercially available from Millipore Corporation (Bedford, Mass.) under the trademark "Waferpure."

The mass flow controller 124 serves to maintain a selected fluid flow rate, appropriate to the end use of the storage and dispensing system.

By the provision of the storage and dispensing system of the character illustratively shown in FIG. 2, it is possible to utilize a storage and dispensing system holding sorbable fluid in the vessel at a low pressure, e.g., in the range of for example 50 to 650 Torr, as desirable from a safety and handling standpoint, but at the same time provide on demand a high flow rate stream of the sorbate fluid from the vessel via the surge tank.

The invention thus contemplates the provision of a storage and dispensing system of the type more fully described in the aforementioned U.S. Pat. No. 5,518,528 and U.S. Pat. No. 5,704,965 in the names of Glenn M. Tom and James V. McManus for "FLUID STORAGE AND DELIVERY SYSTEM UTILIZING CARBON SORBENT MEDIUM," in combination with a surge tank, interposed pump, and flow control means operatively coupled therewith, to provide a sustained high flow rate dispensing of fluid desorptively extracted from the sorbent in the storage and dispensing vessel of the system.

It will be appreciated that the system of the invention may be variously configured and constituted to carry out same in accordance with the broad disclosure herein. For examples the pressure transducer 116, pump 108, pressure regulator 120, mass flow controller 124, and valve 106, as well as any inlet valve associated with the pump, may all be operatively interconnected in a manual or automatic control system circuit, for controllably operating the storage and dispensing system, to provide dispensed fluid at a predetermined rate, or in accordance with a cyclic demand under the control of suitable cycle timer means.

Thus, while the invention has been shown and described with reference to specific features, aspects and embodiments herein, it will be appreciated that the invention is susceptible of a wide variety of other embodiments, features and implementations consistent with the disclosure herein, and the invention is therefore to be broadly construed and interpreted, within the spirit and scope of the foregoing disclosure.

What is claimed is:

1. A system for the storage and on-demand dispensing of a fluid that is sorbable on a selected physical sorbent and that subsequent to sorption is desorbable from the sorbent by pressure-mediated desorption and/or thermally-mediated desorption, said system comprising:

a storage and dispensing vessel, containing said physical sorbent;

a surge tank for holding fluid that is desorbed from the physical sorbent and flowed to the surge tank for subsequent discharge;

first flow passage means joining the surge tank in flow communication with the storage and dispensing vessel;

a pump operatively coupled with the first flow passage means, and selectively operable to effect desorption of said fluid in the storage and dispensing vessel, and transfer of desorbed fluid through the first flow passage means to the surge tank for holding therein;

an actuating assembly for monitoring pressure of fluid held in the surge tank and responsively thereto actuating or deactuating the pump, to maintain a predetermined pressure range of fluid in the surge tank;

second flow passage means for discharging fluid from the surge tank; and flow control means operatively coupled with the second flow passage means, to selectively control flow of fluid from the surge tank through the second flow passage means.

2. A system according to claim 1, further comprising flow control means operatively coupled with the first flow passage means upstream of said pump, to selectively control flow of fluid from the storage and dispensing vessel through the first flow passage means to the surge tank.

3. A system according to claim 1, further comprising means for heating the physical sorbent in the vessel to thermally desorb the fluid therefrom.

* * * * *